Dec. 30, 1941.    A. FEHRER    2,268,478
HEATING, DEFROSTING, AND AIR CONDITIONING ATTACHMENT
Filed March 18, 1940    2 Sheets-Sheet 1
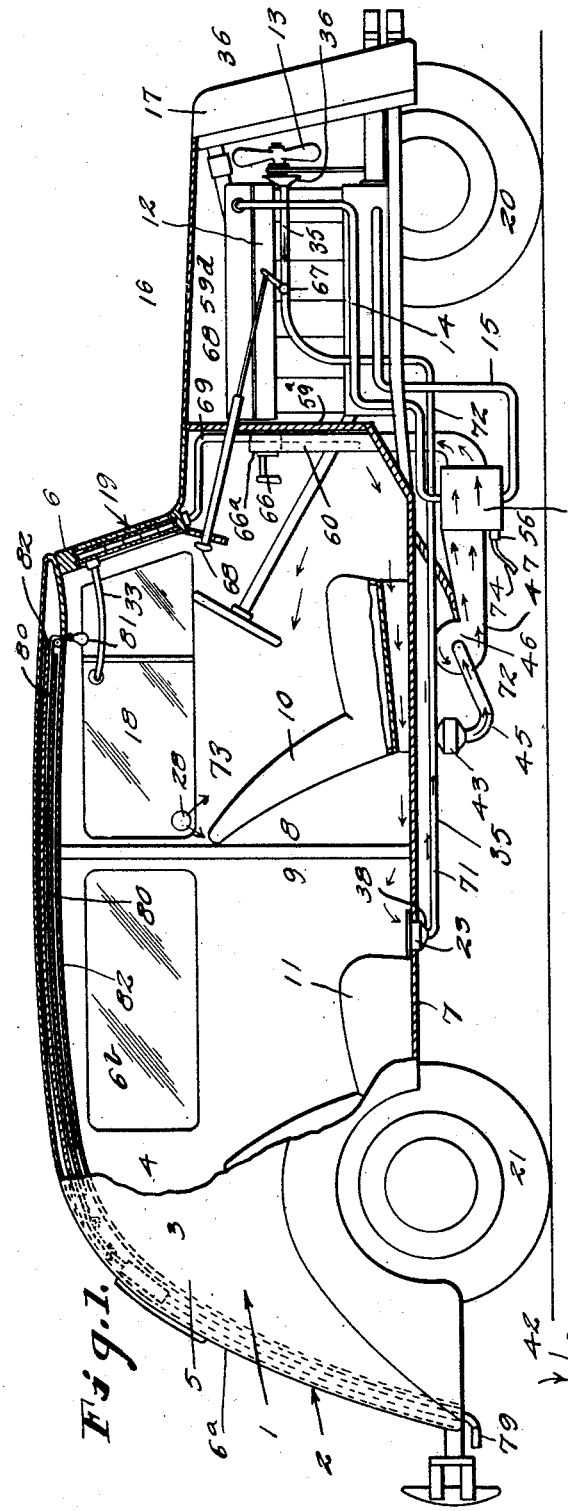
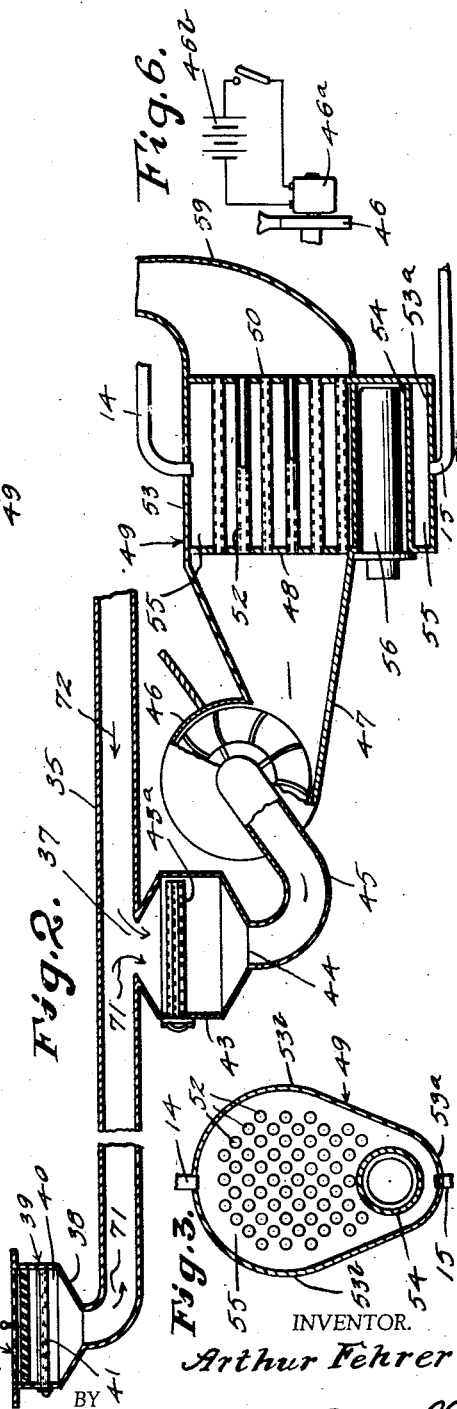
INVENTOR.
Arthur Fehrer
BY
Kimmel & Crowell
ATTORNEY.

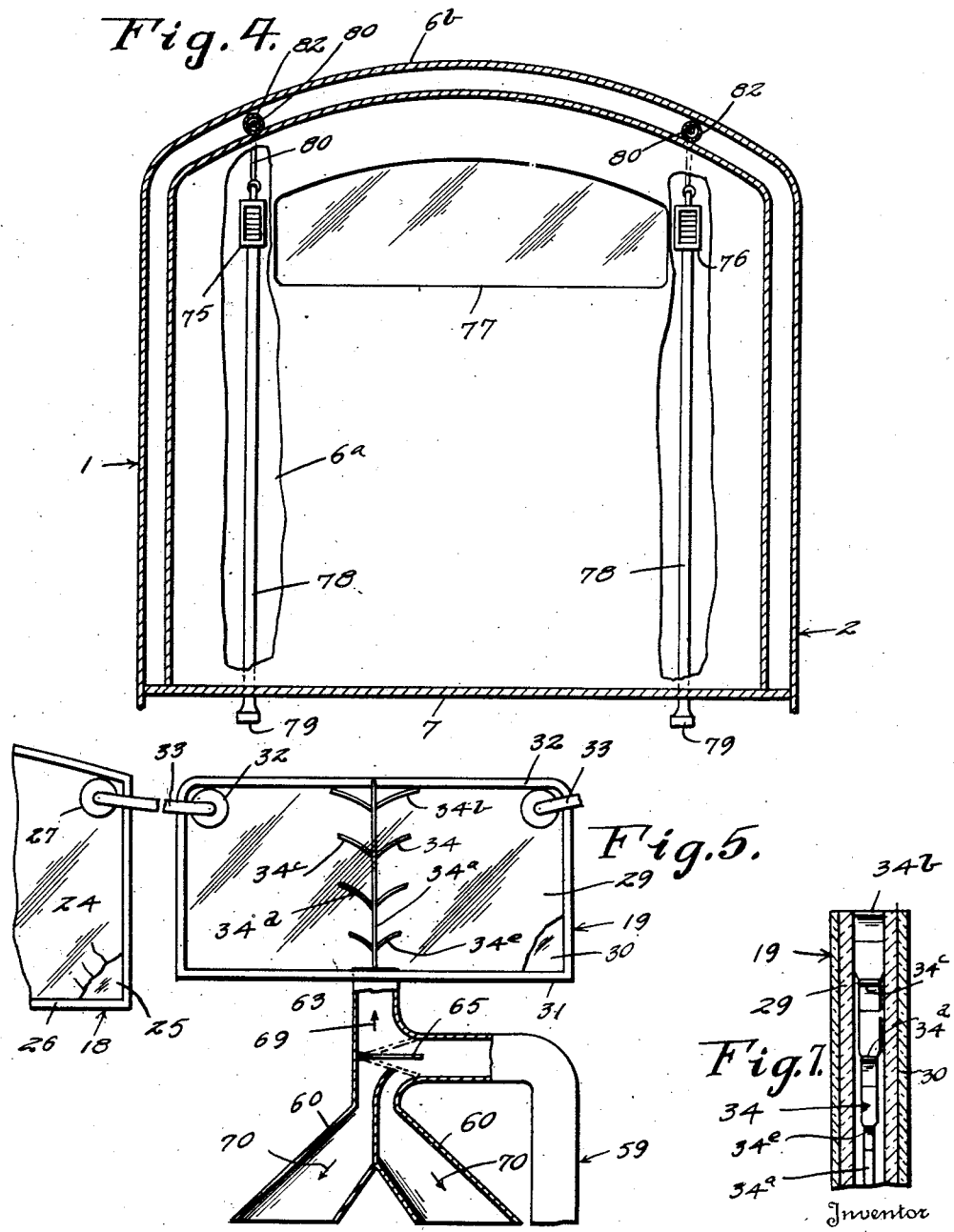

Patented Dec. 30, 1941

2,268,478

UNITED STATES PATENT OFFICE 2,268,478

HEATING, DEFROSTING, AND AIR CONDITIONING ATTACHMENT

Arthur Fehrer, Beaver Dam, Wis.

Application March 18, 1940, Serial No. 324,696

13 Claims. (Cl. 237—12.3)

This invention relates to a heating, defrosting and air conditioning attachment for automobiles.

The invention aims to provide, in a manner as hereinafter set forth, an attachment of the class referred to for not only heating the interior of the body portion of the automobile in cold weather, but further acting to prevent the frosting of the windshield and windows of side doors of the car.

The invention further aims to provide, in a manner as hereinafter set forth, an attachment for the purpose referred to including means for selectively controlling the heating of the interior of the car and to prevent the frosting of the windshield and side windows of the car or for simultaneously heating the interior of the car and to prevent defrosting of the windshield and side windows.

The invention further aims to provide, in a manner as hereinafter set forth, an automobile attachment for the purpose referred to including a windshield formed of front and rear spaced parallel transparent panels, side windows formed of inner and outer spaced parallel transparent panels and means for circulating heated air between the panels of the windshield and said windows and for discharging it from the windows into the car.

The invention further aims to provide, in a manner as hereinafter set forth, a heating, defrosting and air conditioning attachment for automobiles for discharging heated air respectively into the car body at the lower portion of the front of the latter and into the car body at a higher level rearwardly of the other point of discharge to thereby heat the interior of the car, as well as for circulating heated air through the windshield and side windows of the car to prevent frosting of the windshield and said windows resulting in clear front and side vision.

The invention further aims to provide, in a manner as hereinafter set forth, an attachment for the purpose referred to including a normally closed stale air exit insuring when opened the circulation through a closed body of air supplied to the latter.

The invention further aims to provide, in a manner as hereinafter set forth, an attachment for the purpose referred to including a stale air exit under the control of the driver of the automobile for insuring circulation of air through the closed body of the car.

The invention further aims to provide, in a manner as hereinafter set forth, an attachment for the purpose referred to including a normally closed stale air exit under the control of the driver of the automobile for discharge of stale air from the upper portion of the rear of the closed body of the car.

The invention further aims to provide, in a manner as hereinafter set forth, an attachment for the purpose referred to including means whereby heated air supplied to the closed body of the automobile will pass rearwardly from under the front seat to warm the feet of the occupant of the rear seat, as well as upwardly over the front seat to the rear of said body and into the latter from the upper portion of the sides of said body.

The invention further aims to provide, in a manner as hereinafter set forth, a removable electric heater to heat water in hot water heater and the water circulating system of the engine for the purpose of heating a moving body of air to be employed for the heating of the interior of the closed body of an automobile.

The invention further aims to provide, in a manner as hereinafter set forth, an attachment for the purpose set forth including a heater structure interposed in the cooling medium circulating system of the engine for heating said medium and correlated with a suction device for forcing air therethrough to be heated by said medium.

The invention further aims to provide, in a manner as hereinafter set forth, an attachment for automobiles for heating a cold motor in cold weather for easy starting and for warming the interior of the car before the passengers enter, as well as for preventing frosting of the windshield and side windows of the car while driving.

The invention further aims to provide, in a manner as hereinafter set forth, an automobile attachment for heating the interior of the latter and the windshield and side windows of the car by the circulating of heated air through the interior of the car, said windshield and said windows.

The invention further aims to provide, in a manner as hereinafter set forth, an attachment of the class referred to for an automobile including controllable means for heating the interior of the car, as well as the windshield and side windows of the latter by the circulating of heated air through the interior of the car, said windshield and windows.

The invention further aims to provide, in a manner as hereinafter set forth, an attachment of the class referred to including means communicating with the atmosphere and with the interior of an automobile body respectively at the upper portion of the sides, the lower portion of the front and at the bottom of said body for heating said interior, as well as for supplying heat to the interior of the windshield and side windows of said body.

The invention further aims to provide, in a manner as hereinafter set forth, a heating, defrosting and air conditioning attachment for automobiles which is comparatively simple in its construction and arrangement, strong, durable, controllable, readily installed with respect to the automobile, thoroughly efficient in its use and comparatively inexpensive to set up.

Embodying the aims aforesaid and to others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

In the drawings:

Figure 1 is an elevation, partly broken away and partly in longitudinal section of an automobile of the closed body type looking towards one side thereof showing the adaptation therewith of the heating, defrosting and air conditioning attachment in accordance with this invention, Figure 2 is a fragmentary view in longitudinal section of the attachment, Figure 3 is a vertical sectional view of the heater structure forming an element of the attachment, Figure 4 is a view partly in section, partly broken away and partly in elevation looking towards the inner face of the back of the closed body of the automobile and showing other elements of the attachment, and Figure 5 is a fragmentary view on an enlarged scale and in vertical section of the heated air conducting pipe with relation to the windshield, Figure 6 is a diagrammatic view illustrating the operating means for the suction device, and Figure 7 is a section detail of the windshield.

With reference to the drawings, 1 indicates the closed body or body part of an automobile 2. The body 1 includes the sides 3, 4, a rear 5, a front 6, a back 6ª, a top 6ᵇ, a bottom 7 and a front and a rear door 8, 9 respectively in the side 3 or 4. Within body 1 are the front and rear seats 10, 11 respectively. The engine of the automobile 2 is indicated at 12, the fan in advance of the engine at 13 and the water circulation pipes correlated with the engine 12 at 14, 15. The engine hood is indicated at 16, the radiator at 17, the window in the front doors at 18, the windshield at 19, the front wheels at 20 and the rear wheels at 21. The bottom 7 of body 1 will be provided with the opening 23. The circulating pipes 14, 15 of the water system which correlates with the engine 12 will have their rear ends differently arranged than as at present and this will be hereinafter referred to. The windshield 19 is of a different construction than the form of windshield now generally employed and this will be hereinafter referred to. The windows 18 are of a different form than the form now generally used and their construction will be presently referred to.

The windows 18 and windshield 19 form elements of the attachment for the purpose of circulating or conducting heated air to the interior of the body 1. Each window 18 is hollow and formed of an inner and an outer transparent member arranged in parallel spaced relation secured within a frame. The members are indicated at 24, 25 and the frame at 26. The member 24 in proximity to its upper forward corner is formed with an intake nipple 27 and in proximity to its lower rear corner with an outlet opening 28. The nipple 27 is for the intake of heated air to the chamber provided in the windows 18 by the relative arrangement of the members 24, 25 and frame 26. The opening 28 provides for the discharge of heated air from the windows 18 into the upper portion of the interior of the body 1. The windshield 19 is hollow and it is formed of rear and front transparent members arranged in parallel spaced relation secured within a frame. The transparent members of the windshield are indicated at 29, 30 and its frame at 31, and which are so related to form the windshield with a chamber. The member 29 has connected thereto in proximity to its upper corners outlet nipples 32 for heated air. The outlet nipples 32 of the windshield 19 have attached thereto flexible heated air conductors 33, in the form of tubes which are connected to the intake nipples 27 of the windows 18 for supplying heated air to the latter. Arranged within the chamber, provided by the windshield 19 and intersected centrally by the transverse median of the windshield is an air separating and deflecting structure 34 which divides such chamber into a pair of independent compartments, one correlated with one of the nipples 32 and the other correlated with the other nipple 32. The manner of supplying heated air to said compartments of the windshield, which is common to the latter will be hereinafter referred to.

The attachment includes a fresh and cool air conducting pipe 35 of angle form disposed lengthwise of the automobile and having the major portion of its length arranged below the bottom 7 of the body 1 and the remaining portion of its length disposed forwardly of the front 6 of body 1 and at one side of the engine or motor 12. The pipe 35 provides for conducting fresh air from the forepart of the automobile and cool air from the interior of body 1 to an air humidifying element to be referred to. The forward end of pipe 35 has a flared intake 36 located in juxtaposition to and rearwardly of the fan 13. The pipe 35 intermediate its ends is formed with an opening 37 and at its rear end communicates through the bottom 38 of an upstanding container-like member 39 with a chamber 40 formed by the member 39. The chamber 40 has arranged therein an air filter 41. The chamber 40 is for receiving cool air from the interior of body 1 passing through the bottom of the latter. Attached to the floor 7 of body 1 and arranged in the opening 23 is a register 42 for controlling the passage of air from body 1 to the chamber 40. The construction of register 42 is such as to completely shut off the chamber 40 to the interior of body 1 when desired.

The air humidifying element referred to is indicated at 43 and it includes an air conditioning means 43ª. The element 43 communicates at its upper end with the pipe 35 through the opening 37. The element 43 is connected at its upper end to pipe 35 and is formed with an outlet 44 at its lower end which communicates with a conditioned air conducting-off pipe 45 leading to a suction device 46 discharging into a flared conditioned air conductor 47 which is connected to the back 48 of a hot water heater structure 49 for supplying conditioned air to the tubes of said structure to be heated by the latter. The structure 49 includes a front 50, a set of spaced air conducting tubes 52 open at each end, extending from front 50 to back 48 and opening at their rear ends into the conductor 47, a closed top 53, a closed bottom 53ª, a pair of closed sides 53ᵇ and a compartment 54 in its lower portion open at its rear and closed at its front. The compartment 54 is arranged below the set of tubes 52 and the conductor 47. The structure 49 provides a water heating chamber 55 which surrounds the tubes 52 and compartment 54. The tubes 52 have their forward ends opening at the front 50. The rear end of the water circulating pipe 14 opens into the chamber 55 at the top of the latter. The rear end of the water circulating pipe 15 opens into the chamber 55 at the bottom of the latter. There is correlated with structure 49 a heating element 56 for initially heating it. The element 56 is in the form of an electric unit removably mounted in the compartment 55. The structure 49 is substantially of egg-shaped contour in vertical section and rounded at its upper and lower ends.

Connected at its lower end to the top, sides and front of the structure 49 is an upstanding angle-shaped heated air conducting pipe 59 which extends upwardly through the bottom of and rearwardly of the dash board 59ª of the closed body 1. The pipe 59 intermediate its ends is formed with a pair of oppositely disposed downwardly directed branches 60 which are open at their lower ends for discharging heated air into the front of the body 1. The pipe 59 at its upper end is coupled to the bottom of the windshield 19, as at 63, for the purpose of discharging heated air into the chamber provided by the transparent members and frame of the windshield 19. The heated air supplied to the windshield enters the latter at its lower portion and it is divided by the separators and deflectors 34. There is arranged in the pipe 59 (Figure 8) at the junction of the branches 60 therewith, a normally open horizontally disposed damper or valve 65 which when shifted upwardly from normal position shuts off the passage of heated air to the windshield 19, and when shifted downwardly from normal shuts off the heated air to the branches 60. The means for operating the damper 65 is indicated at 66 and extends rearwardly from the pipe 59 intermediate the ends of the latter.

There is connected with the pipe 35 a spring controlled cutoff 67 disposed rearwardly of and in proximity to the flared intake end 36 of said pipe. The cut-off 67 is normally inactive and the means for shifting it to active position is indicated at 68 and it is mounted in and extends forwardly from the instrument panel 66ª. The cut-off 67 is operated by the driver when fresh air is needed.

The arrow 69 indicates the upward travel of the heated air to the windshield 19. The arrows 70 indicate the downward travel of the heated air through the branches 60. The arrows 71 indicate the direction of travel of the air from body 1 in pipe 35 to the element 43. The arrows 72 indicate the direction of travel of the air in the pipe 35 from its intake end to the element 43. The arrows 73 indicate the discharge of heated air from the windows 18 into the body 1. The suction device 46 is operated from an electric motor 46ª electrically connected to the battery 46ᵇ of the automobile. A plug connection for the element 56 is indicated at 74 and which is employed for detachably plugging in element 56 in a service line.

The attachment includes a normally closed stale air exit means under the control of the driver of the automobile and its structural arrangement and its purpose will be more fully referred to.

With respect to the attachment heating the interior of the body 1 of the automobile by the circulating of air therethrough and to have even temperature, it is necessary to have, as a part of the attachment a cold air return which is provided for by the register 42 controlling communication between chamber 40 and the interior of body 1, the pipe 35 opening into the element 43. The pipe 35 functions as an intake for element 43 for the filtered air from body 1 and fresh air conducted from the funnel shaped intake at the forward end of pipe 35. The element 43 constitutes an air conditioner for the cool and fresh air conducted thereto by the pipe 35. When adding fresh air from the outside, when the pressure becomes as great on the inside as the pressure that is forcing fresh air in, the circulation of air ceases in the body 1, or in other words when the pressure in the body 1 becomes as great as the pressure that was forced into said body the heated air is at a standstill. This objectionable feature is overcome by providing the attachment with the stale air exit means under the control of the driver.

The said normally closed stale air exit means includes a pair of registers 75, 76 disposed at an angle to an extent to have their shutters normally closed by gravity. These registers are arranged in the back 6ª of body 1, one at each side of the rear window 77. These registers are fastened to back 6ª and project forwardly through the upholstering. Each register has correlated therewith a stale air conducting off tube 78 arranged within and depending from the back 6ª. The lower ends of the tubes 78 are formed with rearwardly directed elbows 79. When the shutters of a register are opened by a means to be referred to, the suction, on the forward drive of the automobile created on the outlet end of the elbows will draw off the stale air from the upper portion of the interior of body 1 where it is naturally located, and by such action will provide for the circulation of air through body 1.

Attached to the shutters of each register is a pull member 80, of light steel wire which extends upwardly through the back 6ª and forwardly through the top 6ᵇ and terminates in a depending handle 81 arranged in convenient reach of the driver of the automobile. Guide tubes 82 are provided for the pull members.

The heated air discharged into the body 1 by the branches 60 of the pipe 59 will pass under the front seat, the frame work of the latter on which the cushion rests will be built to have as much clearance as possible so as to have heated air pass under the front seat to warm the feet of the occupant of the rear seat, and the rest of the heated air will rise up and pass over the front seat to the rear of body 1 and be redrawn through the register 42 to be reheated again.

The air conditioning means 43ª consists of an oil impregnated split steel wire pad encased in a metal holder. The means 41 and 43ª are capable of being removed for the purpose of cleaning it when it becomes clogged with foreign substances.

The heater structure 49 which is common to the heating of water and air functions whereby the air as it passes through the tubes is heated, as the hot water circulates about the tubes. The structure 49 has a larger hot water capacity and provides for hotter air, because the air blown through the tubes, by the suction device strikes the whole inside diameter of the tubes.

The electric heater 56 which forms an element of the heater structure 49 is a one thousand watt, one hundred and ten volt unit that is to be plugged into a service line. This unit is arranged below the tubes 52 and its purpose, when plugged into a service line, is to initially heat the water in the structure 49 and from there follow the pipe lines to the engine head for easy starting of the motor in cold weather. The suction device or fan is thrown into operation to force the air through the tubes 52 to heat the air, and the heated air is supplied to body 1 to heat the interior of the body 1 while the motor is being warmed up. After the water and the interior of body 1 have been heated and the motor started, the element or unit 56 is disconnected from the service line and if desired it may be removed from structure 49.

The attachment may be employed for cooling the interior of the body 1 in summertime by installing a small refrigerant plant in the car, closing the engine connections, opening connections to the plant to have cold water circulate through structure 49, operating the suction device 46 whereby the air from body 1 will pass through tubes 52, be cooled and returned in such condition to the interior of body 1 through pipe 59 and branches 60. In this connection the windshield is closed to pipe 59 by shifting the damper 65 to its upper dotted line position, Figure 6.

It is to be understood that, when the attachment functions as a heating system, that heated air may be supplied to body 1 independently of supplying air to the windshield and this is had when damper 65 is in its upper dotted line position, Figure 6, but when damper 65 is in its normal position, full line showing Figure 6, the heated air is supplied to body 1 and to the windshield.

The hot water heater forming an element of the heating system, in accordance with this invention and employed for heating air is entirely different from the form of heaters heretofore employed. The heater heretofore generally used is of the radiator type, with the hot water travelling through the tubes and the air passing the tubes on the outside of the latter. The hot water heater, employed in the heating system, in accordance with this invention is just opposite to that type in which the hot water passes through the tubes, as the heater employed in this invention provides for the hot water surrounding the tubes and the air being blown directly through the tubes, and as the heater has a larger hot water capacity it naturally follows that there would be a hotter flow of hot air.

As to installing a one thousand watt, one hundred and ten volts electric unit in the heating system, in accordance with this invention, it will be pointed out that in cold weather one desires to have as warm an automobile when one enters as is his home, and to obtain this the unit is plugged in a service line several minutes before one enters the automobile and the suction device is then switched on, and thereby the interior of the body of the car will be warmed up, and as the car is getting warmed up, the engine is being warmed up at the same time to make easy starting.

The structure 34 (Figures 5 and 7) includes a separator 34$^a$ of a length to extend from the bottom to a point near the top of the frame 31. The structure 34 includes four flared deflectors 34$^b$, 34$^c$, 34$^d$ and 34$^e$ arranged in superposed spaced relation and connected centrally of their lower ends to the separator 34$^a$. The deflectors extend laterally in opposite directions from the separator 34$^a$, progressively decrease in length from the deflector 34$^b$ to the deflector 34$^e$ as shown by Figure 5. The bodies of the deflectors progressively decrease in width from the deflector 34$^b$ to the deflector 34$^e$, as shown by Figure 7. As the deflectors decrease in length in a manner as aforesaid each lower deflector is overlapped by an upper deflector whereby a part of the heated air will strike each deflector and will be deflected lengthwise of the windshield. The top deflector has its body of a width to abut the inner faces of the panels 29, 30. The top deflector also abuts the inner face of the top of the frame 31.

What I claim is:

1. In a heating, defrosting and air conditioning attachment for automobiles of the closed body type, in combination, the cooling water circulation system of the automobile, the side windows and the windshield of the automobile, said windows being formed with heated air receiving chambers formed with intakes and outlets, said windshield being formed with heated air receiving compartments having outlets and a common intake, the outlets of the chambers of the windows opening into the interior of the closed body of the automobile, means for establishing communication between the outlets of the compartments of the windshield with the intakes of the chambers of said windows, an air heating structure interposed in said system including an electrical heater, fresh and cool air conducting means leading from the interior of said body and from beneath the engine head of the automobile to one side of said structure, and an upwardly directed heated air conducting means leading from the front of said structure upwardly in the front portion of said body, opening intermediate its ends for discharging heated air into the lower portion of said body at the front of the latter and opening at its upper end into the common intake for the compartments of the windshield.

2. In a heating, defrosting and air conditioning attachment for automobiles of the closed body type, in combination, the cooling water circulation system of the automobile, the side windows and the windshield of the automobile, said windows being formed with heated air receiving chambers formed with intakes and outlets, said windshield being formed with heated air receiving compartments having outlets and a common intake, the outlets of the chambers of the windows opening into the interior of the closed body of the automobile, means for establishing communication between the outlets of the compartments of the windshield with the intakes of the chambers of said windows, an air heating structure interposed in said system including an electrical heater, fresh and cool air conducting means leading from the interior of said body and from beneath the engine head of the automobile to one side of said structure, an upwardly directed heated air conducting means leading from the front of said structure upwardly in the front portion of said body, opening intermediate its ends for discharging heated air into the lower portion of said body at the front of the latter and opening at its upper end into the common intake for the compartments of the windshield, said fresh and cool air conducting means including a controllable air filtering chamber opening into said body, an air filtering element forwardly of and spaced from said filtering chamber, a pipe opening at rear end into said filtering chamber, communicating intermediate its ends with said element and having its forward end permanently open, and a suction device communicating with and interposed between said element and structure.

3. In a heating, defrosting and air conditioning attachment for automobiles of the closed body type, in combination, the cooling water circulation system of the automobile, the side windows and the windshield of the automobile, said windows being formed with heated air, receiving chambers formed with intakes and outlets, said windshield being formed with heated air receiving compartments having outlets and a common intake, the outlets of the chambers of the windows opening into the interior of the closed body of the automobile, means for establishing communication between the outlets of the compartments of the windshield with the intakes of the chambers of said windows, an air heating structure interposed in said system including an electrical heater, fresh and cool air conducting means leading from the interior of said body and from beneath the engine head of the automobile to one side of said structure, an upwardly directed heated air conducting means leading from the front of said structure upwardly in the front portion of said body, opening intermediate its ends for discharging heated air into the lower portion of said body at the front of the latter and opening at its upper end into the common intake for the compartments of the windshield, and means arranged in said heated air conducting means and operated from within said body for shutting off the flow of heated air to said windshield without impairing the flow of heated air to the interior of said body.

4. In a heating, defrosting and air conditioning attachment for automobiles, an air heating structure disposed below the closed body of the automobile, a controllable fresh and cool air conducting means communicating with the interior of said body, opening into the atmosphere forwardly of said body and leading to rear side of said structure, and a controllable heated air conducting means leading from the front side of said structure into said body for discharging heated air into and longitudinally of said body from the front of the latter and into and laterally of said body from opposite sides of the latter, the longitudinal outlet of said means being located adjacent the floor level of said body and the lateral outlets of said means being located adjacent the passenger's head and shoulder level.

5. In a heating, defrosting and air conditioning attachment for automobiles, an air heating structure disposed below the closed body of the automobile, a controllable fresh and cool air conducting means communicating with the interior of said body, opening into the atmosphere forwardly of said body and leading to one side of said structure, and a controllable heated air conducting means leading from another side of said structure into said body for discharging heated air into and longitudinally of said body from the front of the latter and into and laterally of said body from opposite sides of the latter, the longitudinal outlet for said means being located adjacent the floor level of said body and the lateral outlets of said means being located adjacent the passenger's head and shoulder level, said fresh and cool air conducting means including an air humidifying element and a suction device, said element arranged rearwardly of and communicating with said device, and said device arranged rearwardly of and communicating with said structure.

6. In a heating, defrosting and air conditioning attachment for automobiles, an air heating structure disposed below the closed body of the automobile, a controllable fresh and cool air conducting means communicating with the interior of said body, opening into the atmosphere forwardly of said body and leading to one side of said structure, and a controllable heated air conducting means leading from another side of said structure into said body for discharging heated air into and longitudinally of said body from spaced points of the front of the latter and into and laterally of said body from opposite sides of the latter, the longitudinal outlets of said means being located adjacent the floor level of said body and the lateral outlets of said means being located adjacent the passenger's head and shoulder level, said heated air-conducting means including a pair of branches communicating with said longitudinal outlets.

7. In a heating, defrosting and air conditioning attachment for automobiles, an air heating structure disposed below the closed body of the automobile, a controllable fresh and cool air conducting means communicating with the interior of said body, opening into the atmosphere forwardly of said body and leading to one side of said structure, a controllable heated air conducting means leading from the other side of said structure into said body for discharging heated air into and longitudinally of said body from the front of the latter and into and laterally of said body from opposite sides of the latter at a higher level than the level of the longitudinal discharge, said heated air conducting means including a chambered windshield and a pair of opposed chambered side windows of said body, the chambers of the windshield communicating with the chambers of said windows, and the chambers of said windows having outlets opening into said body and constituting the outlets for the lateral discharge of the heated air.

8. In a heating, defrosting and air conditioning attachment for automobiles, an air heating structure disposed below the closed body of the automobile, a controllable fresh and cool air conducting means communicating with the interior of said body, opening into the atmosphere forwardly of said body and leading to one side of said structure, a controllable heated air conducting means leading from the other side of said structure into said body for discharging heated air into and longitudinally of said body from the front of the latter and into and laterally of said body from opposite sides of the latter at a higher level than the level of the longitudinal discharge, said fresh and cool air conducting means including an air filtering means, an air humidifying means communicating with said filtering means and a suction device communicating with said humidifying means and said heating structure, said heated air conducting means including a chambered windshield and a pair of opposed chambered side windows of said body, the chambers of the windshield communicating with the chambers of said windows, and the chambers of said windows having outlets opening into said body and constituting the outlets for the lateral discharge of the heated air.

9. In a heating, defrosting and air conditioning attachment for automobiles, an air heating structure disposed below the closed body of the automobile, a controllable fresh and cool air conducting means communicating with the interior of said body, opening into the atmosphere forwardly of said body and leading to one side of said structure, a controllable heated air conducting means leading from another side of said structure up into the front of said body for discharging heated air into and longitudinally of said body from the front of the latter and into and laterally of said body from opposite sides of the latter, the longitudinal outlet of said means being located adjacent the floor level of said body and the lateral outlets of said means being located adjacent the passenger's head and shoulder level, and a controllable stale air exit means in the back of said body, said exit means having an outlet at the lower portion of said back permanently opening into the atmosphere and a normally closed intake at the upper portion of said back for opening into said body, the outlet of said stale air exit means communicating with said intake in the upper portion of said back.

10. In a heating attachment for the closed body of an automobile, a heater structure interposed in the cooling medium system of the engine of the automobile and including horizontally disposed air conducting tubes open at each end and a chamber surrounding said tubes for the cooling medium of said system, a controllable fresh and cold air conducting means communicating at its rear end with the interior of said closed body, opening at its forward end into the atmosphere forwardly of said body and communicating intermediate its ends with the rear ends of the tubes, and a heated air conducting means communicating with said tubes at their forward ends at and extending upwardly into the front of and for discharging heated air into said body.

11. In a heating attachment for the closed body of an automobile, a heater structure interposed in the cooling medium system of the engine of the automobile and including air conducting tubes open at each end and a chamber surrounding said tubes for the cooling medium of said system, a controllable fresh and cold air conducting means communicating with the interior of said closed body, opening into the atmosphere forwardly of said body and opening in said tubes at one end of the latter, a heated air conducting means communicating with said tubes at the other end thereof for discharging heated air into said body, said fresh and cold air conducting means including a suction device for forcing air through said tubes to said heated air conducting means, an air humidifying means communicating with said device and the atmosphere, an filtering means communicating with the humidifying means and said body, and a controllable stale air exit means carried by the back of said body, said exit means having an outlet at the bottom of said back permanently opening into the atmosphere and a normally closed intake near the top of said back for opening into said body.

12. In a heating attachment for the closed body of an automobile, the combination of a hot air heating structure carried by said body exteriorly thereof, a heated air conducting means carried by the body and being so formed for directing heated air lengthwise of said body from the front thereof and for directing heated air laterally above the level of the heated air directed lengthwise of said body, a pair of spaced parallel normally closed controllable stale air exit means carried by the back of said body, opening at the upper portion of the forward face of said back into said body and opening at the lower portion of the rear face of said back into the atmosphere, and means for directing cool and fresh air to said structure and including a blower, connecting means between the blower and the air heating structure, an air humidifying means rearwardly of and communicating with the blower, an air filtering means rearwardly of and communicating with said humidifying means, and connecting means between said air heating structure and heated air conducting means.

13. In a heating attachment for the closed body of an automobile, the combination of a hot air heating structure carried by said body exteriorly thereof, a heated air conducting means carried by the body and being so formed for directing heated air lengthwise of said body from the front thereof adjacent the level of the floor of said body and for directing heated air laterally adjacent the level of the passenger's head and shoulders, a pair of spaced parallel normally closed controllable stale air exit means carried by the back of said body, opening at the upper portion of the forward face of said back into said body and opening at the lower portion of the rear face of said back into the atmosphere, means for directing cool and fresh air to said structure and including a blower, connecting means between said blower and said structure, an air humidifying means rearwardly of and communicating with the blower and an air filtering means rearwardly of and communicating with said humidifying means, connecting means between said structure and heated air conducting means, and means arranged within the forward portion of said body for controlling said stale air exit means.

ARTHUR FEHRER.